(12) United States Patent
Wada

(10) Patent No.: US 8,776,614 B2
(45) Date of Patent: Jul. 15, 2014

(54) CORIOLIS MASS FLOWMETER PROVIDING HIGH ACCURACY, STABLE EXCITATION WITH A SHORT DELAY WHILE EMPLOYING DIGITAL SIGNAL PROCESSING

(75) Inventor: Masami Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 441 days.

(21) Appl. No.: 13/277,708

(22) Filed: Oct. 20, 2011

(65) Prior Publication Data

US 2012/0096950 A1 Apr. 26, 2012

(30) Foreign Application Priority Data

Oct. 21, 2010 (JP) ................................. 2010-236566

(51) Int. Cl.
*G01F 1/84* (2006.01)
*G01F 1/00* (2006.01)

(52) U.S. Cl.
USPC .......................... 73/861.356; 702/45; 341/143

(58) Field of Classification Search
None
See application file for complete search history.

(56) References Cited

U.S. PATENT DOCUMENTS

| 5,024,104 A * | 6/1991 | Dames ..................... 73/861.357 |
| 5,869,770 A | 2/1999 | Yoshimura et al. |
| 2003/0033096 A1 | 2/2003 | Hansen et al. |

FOREIGN PATENT DOCUMENTS

| JP | 07-181069 A | 7/1995 |
| JP | 2003-302272 A | 10/2003 |
| WO | 03021425 A2 | 3/2003 |

OTHER PUBLICATIONS

Extended European Search Report Issued on May 8, 2012 in Corresponding European Application No. 11186134.0.

* cited by examiner

*Primary Examiner* — Harshad R Patel
(74) *Attorney, Agent, or Firm* — Sughrue Mion, PLLC

(57) ABSTRACT

First and second $\Delta\Sigma$ modulators convert output signals of two sensors into pulse density signals. First and second LPFs convert the pulse density signals into multi-bit signals. A signal computing module calculates a mass flow rate based on the multi-bit signals. A resonance circuit generates an excitation signal based on the output signals of the sensors. A drive output module amplifies the excitation signal. An exciter excites the measurement tube using an amplified excitation signal. A multiplier amplifies one of the pulse density signals to generate a multi-bit signal. An amplification factor controller controls an amplification factor of the multiplier based on the multi-bit signal. A third $\Delta\Sigma$ modulator converts an amplified signal into a pulse density signal. A DAC generates the excitation signal based on the pulse density signal.

4 Claims, 7 Drawing Sheets

CUTOFF FREQUENCY
(GAIN k)

CUTOFF FREQUENCY
(SAMPLING FREQUENCY)

CORIOLIS MASS FLOWMETER PROVIDING HIGH ACCURACY, STABLE EXCITATION WITH A SHORT DELAY WHILE EMPLOYING DIGITAL SIGNAL PROCESSING

TECHNICAL FIELD

The present disclosure relates to a Coriolis mass flowmeter for measuring the mass flow rate of a fluid flowing through a measurement tube.

RELATED ART

Coriolis mass flowmeters are known in which a measurement tube (U-shaped tube or straight tube) which is fixed at both ends is vibrated as a fluid flows through it and a mass flow rate of the fluid is calculated on the basis of a pair of output signals of two sensors which measure deformation amounts of both ends of the measurement tube.

In such Coriolis mass flowmeters, a measurement tube is vibrated by Coriolis force and, to cause this effect correctly, it is excited so as to resonate. More specifically, deformation amounts of the measurement tube are measured with sensors and the measurement tube is excited by supplying it with power according to the measured deformation amounts.

For example, Patent document 1 discloses a configuration of an analog excitation circuit. In view of the fact that the resonance characteristic depends on the diameter of a measurement tube, Patent document 1 discloses a configuration capable of securing stable vibration for plural measurement tubes having different diameters by making it possible to change the amplitude of resonance vibration.

PATENT DOCUMENTS

[Patent document 1] JP-A-2003-302272

As described in Patent document 1, it is useful to control the amplitude of resonance vibration in a manner that depends on the diameter. However, constructing the analog excitation circuit shown in Patent document 1 is associated with problems that the number of components of a filter such as operational amplifiers, analog switches, operational resistors, and capacitors is large, the board area is large, and the excitation circuit is expensive. In contrast, where digital signal processing is employed, an IC such as a gate array or a DSP (digital signal processor) can be used, whereby the board area can be reduced and the excitation circuit can be made less expensive.

However, in general, Coriolis mass flowmeters which perform high-accuracy mass flow measurements may use a highly accurate $\Delta\Sigma$ AD converter IC. Such an AD converter incorporates a $\Delta\Sigma$ modulator and an LPF, and delay occurs when the LPF coverts an analog signal into a digital signal. Therefore, a phase deviation occurs in exciting a measurement tube through resonance, which causes problems that the accuracy of vibration control is lowered and, as a result, the measurement accuracy is lowered.

SUMMARY

Exemplary embodiments of the present invention provide a Coriolis mass flowmeter capable of high-accuracy, stable excitation with only a short delay though it employs digital signal processing.

A Coriolis mass flowmeter according to an exemplary embodiment of the invention includes:

two sensors configured to measure deformation amounts of a measurement tube which generates when the measurement tube which is fixed at both ends is vibrated as a fluid flows through it;

a first $\Delta\Sigma$ modulator and a second $\Delta\Sigma$ modulator configured to convert output signals of the two sensors into pulse density signals, respectively;

a first LPF and a second LPF configured to convert the pulse density signals that are output from the first $\Delta\Sigma$ modulator and the second $\Delta\Sigma$ modulator into multi-bit signals, respectively;

a signal computing module configured to calculate a mass flow rate on the basis of the two multi-bit signals;

a resonance circuit configured to generate an excitation signal on the basis of at least one of the output signals of the two sensors;

a drive output module configured to amplify the excitation signal; and an exciter configured to excite the measurement tube using an amplified excitation signal, wherein the resonance circuit comprises:

a multiplier configured to amplify one of the pulse density signals that are output from the first $\Delta\Sigma$ modulator and the second $\Delta\Sigma$ modulator or a signal generated from the pulse density signals that are output from the first $\Delta\Sigma$ modulator and the second $\Delta\Sigma$ modulator to generate a multi-bit signal;

an amplification factor controller configured to control an amplification factor of the multiplier on the basis of at least one of the multi-bit signals that are output from the first LPF and the second LPF so that vibration amplitude of the measurement tube is stabilized;

a third $\Delta\Sigma$ modulator configured to convert an amplified, multi-bit signal into a pulse density signal; and a DAC configured to generate the excitation signal on the basis of the pulse density signal that is output from the third $\Delta\Sigma$ modulator.

In the above configuration, an output(s) of the $\Delta\Sigma$ modulator(s) having only a very short delay is used for generating an excitation signal and the factor of its amplification is controlled on the basis of a multi-bit signal(s). This makes it possible to perform highly accurate resonance excitation with only a short delay even by digital control. Because of the digital control, the number of components and the board area can be made smaller and component costs can be made lower than in the conventional analog circuit.

The amplification factor controller may comprise:

a rectification circuit configured to take an absolute value of one of the multi-bit signals that are output from the first LPF and the second LPF or a signal generated from the multi-bit signals that are output from the first LPF and the second LPF;

a third LPF configured to smooth an output signal of the rectification circuit by cutting high-frequency components thereof;

a subtractor configured to obtain a difference value between a smoothed multi-bit signal and a target value;

a variable amplifier configured to amplify the difference value; and a register configured to store cutoff frequencies to be used in the third LPF, target values to be used in the subtractor, and amplification factors to be used in the variable amplifier in such a manner that they are correlated with respective diameters of measurement tubes.

With these features, a single excitation circuit can excite measurement tubes having different diameters stably because the amplification factor controller sets a cutoff frequency to be used in the third LPF, a target value to be used in the subtractor, and an amplification factor to be used in the variable amplifier that are suitable for the diameter of the measurement tube attached. When the diameter of the measurement tube has been changed, output values to be used of the register can be changed.

The Coriolis mass flowmeter further includes:

a second resonance circuit configured to supply an excitation signal to the drive output module, the second resonance circuit comprising a comparator configured to binarize one of the multi-bit signals that are output from the first LPF and the second LPF or the signal generated from the multi-bit signals that are output from the first LPF and the second LPF and a second DAC configured to convert a binarized signal into an analog signal;

a selector configured to switch between the resonance circuit and the second resonance circuit; and a switching determination module configured to control the selector;

wherein the switching determination module comprises:

a rectification circuit configured to take an absolute value of one of the multi-bit signals that are output from the first LPF and the second LPF or the signal generated from the multi-bit signals that are output from the first LPF and the second LPF;

a fourth LPF configured to smooth an output signal of the rectification circuit by cutting high-frequency components thereof;

a comparator configured to compare a high-frequency-components-cut multi-bit signal with a threshold value; and a register configured to store cutoff frequencies to be used in the fourth LPF so as to be correlated with the respective diameters of the measurement tubes and to store threshold values to be used in the comparator so as to be correlated with the respective target values to be used in the subtractor, and wherein the drive output module is configured to amplify the excitation signal which is an output signal of the resonance circuit or the second resonance circuit selected by the selector.

With these features, the measurement tube is excited by the second resonance circuit having a large amplification factor at the time of activation when the vibration amplitude of the measurement tube is small. After the vibration amplitude of the measurement tube has exceeded a certain value, the measurement tube is excited by the resonance circuit which is controlled so that the vibration amplitude is kept constant. A stable state can thus be reached quickly.

The Coriolis mass flowmeter further includes:

a second adder configured to add together the pulse density signals that are output from the first ΔΣ modulator and the second ΔΣ modulator, and a third adder configured to add together the multi-bit signals that are output from the first LPF and the second LPF, wherein an addition signal generated by the second adder is supplied to the multiplier, and wherein an addition multi-bit signal generated by the third adder is supplied to the amplification factor controller.

With these features, since the addition signal of two signals (two pulse density signals or two multi-bit signals) are used, even if the output of one or both of the sensors is disordered because of mixing of air bubbles in a fluid, influence of the disorder can be reduced.

According to the exemplary embodiments of the present invention, it is possible to provide a Coriolis mass flowmeter capable of high-accuracy, stable excitation with only a short delay though it employs digital signal processing.

DETAILED DESCRIPTION

Exemplary embodiments of the present invention will be hereinafter described in detail with reference to the accompanying drawings. Dimensions, materials, specific numerical values, etc. shown in the embodiments are just examples for facilitating understanding of the invention and should not be construed as restricting the invention unless otherwise specified. In this specification including the drawings, elements having substantially the same function and configuration will be given the same reference symbol and will not be described redundantly. Elements that are not directly related to the invention may be omitted.

Embodiment 1

Figure 1:
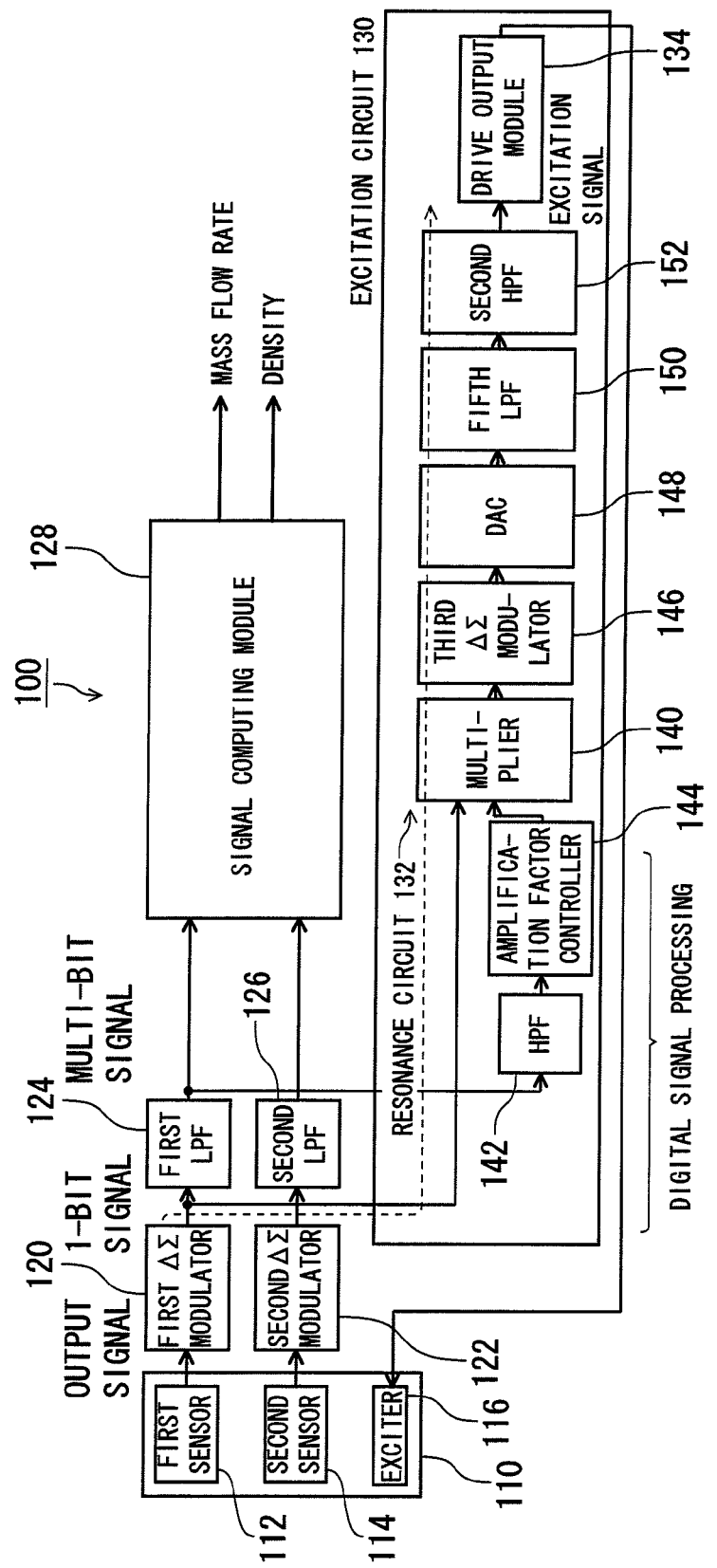
FIG. 1 is an exemplary view showing a Coriolis mass flowmeter according to a first embodiment.

FIG. 1 shows a Coriolis mass flowmeter 100 according to a first embodiment. A detector 110 includes a first sensor 112 and a second sensor 114, and an exciter 116. The first sensor 112 and the second sensor 114 measure deformation amounts (vibration) of both ends, which are fixed, of a measurement tube (not shown). The exciter 116 excites the measurement tube using an excitation signal (described later). The measurement tube may be an existing one and may be either a U-shaped tube or a straight tube. Plural kinds of tubes having different diameters can be attached to the detector 110.

When excited in the vertical direction, a measurement tube vibrates in a first-order mode (half-wavelength vibration having a single antinode) if no fluid is flowing through it. On the other hand, if a fluid is flowing through it, a measurement tube vibrates in a second-order mode (one-wavelength vibration having a single node and two antinodes) because it is twisted due to Coriolis force. Since the twist angle is proportional to the mass flow rate of a fluid, a mass flow rate of a fluid flowing through a measurement tube can be detected by measuring deformation amounts at both ends of it with the first sensor 112 and the second sensor 114.

A pair of output signals that are output from the first sensor 112 and the second sensor 114 are ΔΣ-modulated into 1-bit pulse density signals by a first ΔΣ modulator 120 and a second ΔΣ modulator 122, respectively. In general, the ΔΣ modulation is not necessarily of 1 bit and may be of such a type as to produce a multi-bit output signal. However, this embodiment is directed to the case of employing 1-bit ΔΣ modulation. The invention is not limited to this case.

The pulse density signals that are output from the first ΔΣ modulator 120 and the second ΔΣ modulator 122 are converted into multi-bit signals (ordinary digital data) by a first LPF 124 and a second LPF 126, respectively.

The two multi-bit signals are supplied to a signal computing module 128, where a mass flow rate and a density are calculated. The operation of the signal computing module 128 will not be described in detail because it is described in detail in, for example, an earlier application (JP-A-7-181069) of the present applicant.

An excitation circuit 130 is a circuit for exciting the measurement tube by driving the exciter 116. In the embodiment, the excitation circuit 130 receives the pulse density signal that is output from the first ΔΣ modulator 120 and the multi-bit signal that is output from the first LPF 124.

The excitation circuit 130 includes a resonance circuit 132 and a drive output module 134. The resonance circuit 132 generates an excitation signal on the basis of the output signals of the sensors (the above pulse density signal and multi-bit signal). The drive output module 134 amplifies the excitation signal. The resonance circuit 132 will be described below.

The resonance circuit 132 includes a multiplier 140, an HPF 142, an amplification factor controller 144, a third ΔΣ modulator 146, a DAC 148, a fifth LPF 150 and a second HPF 152. In the resonance circuit 132, the pulse height (level) of the pulse density signal that is output from the first ΔΣ modulator 120 is amplified by the multiplier 140 into a multi-bit pulse density signal. On the other hand, a DC component (offset) of the multi-bit signal that is output from the first LPF 124 is cut by the HPF 142. The amplification factor controller 144 determines an amplification factor of the multiplier 140 on the basis of a resulting multi-bit signal.

The amplification factor controller 144 controls the amplification factor on the basis of the multi-bit signal that is output from the HPF 142 so that the vibration amplitude of the measurement tube is stabilized. A detailed example configuration of the amplification factor controller 144 will be described later.

Although in FIG. 1 the pulse density signal that is output from the first ΔΣ modulator 120 is amplified, a modification is possible in which the pulse density signal that is output from either of the first ΔΣ modulator 120 and the second ΔΣ modulator 122 is amplified. In this case, the multi-bit signal that is output from the first LPF 124 or the second LPF 126 that is connected to the first ΔΣ modulator 120 or the second ΔΣ modulator 122 to which the multiplier 140 is connected is input to the HPF 142.

The multi-bit pulse density signal obtained through pulse height amplification by the multiplier 140 is ΔΣ-modulated by the third ΔΣ modulator 146 into a 1-bit pulse density signal. If the pulse height is amplified by a factor of 1.2 by the multiplier 140, the pulse density is increased by a factor of 1.2 by the third ΔΣ modulator 146. The first ΔΣ modulator 120 to the third ΔΣ modulator 146 perform digital signal processing.

The 1-bit pulse density signal that is output from the third ΔΣ modulator 146 is converted into an analog signal by the DAC 148. For example, the digital-to-analog conversion is performed in such a manner that the L level and the H level are converted into 0 V and 2.5 V, respectively. High-frequency components (quantization noise) of the ΔΣ modulation are removed by the fifth LPF 150, whereby conversion is made to an ordinary analog waveform. A DC component is cut by the second HPF 152, and a resulting analog excitation signal is supplied to the drive output module 134. The drive output module 134 amplifies the excitation signal and drives the exciter 116. Resonance excitation is performed by the above-described series of operations.

It should be mentioned specially that a considerable delay occurs in each of the first LPF 124 and the second LPF 126 whereas only a very short delay occurs in each of the first ΔΣ modulator 120 and the second ΔΣ modulator 122. On the other hand, a multi-bit signal (ordinary digital signal) is necessary to determine a signal value as in the case of an amplification factor control. Therefore, in the above configuration, an output of the ΔΣ modulator (first ΔΣ modulator 120) having only a short delay is used for generating an excitation signal and the factor of its amplification is controlled on the basis of a multi-bit signal. This makes it possible to perform highly accurate resonance excitation with only a very short delay even by digital control and to thereby obtain a stable amplitude. Because of the digital control, the number of components and the board area can be made smaller and component costs can be made lower than in the conventional analog circuit.

Figure 2:
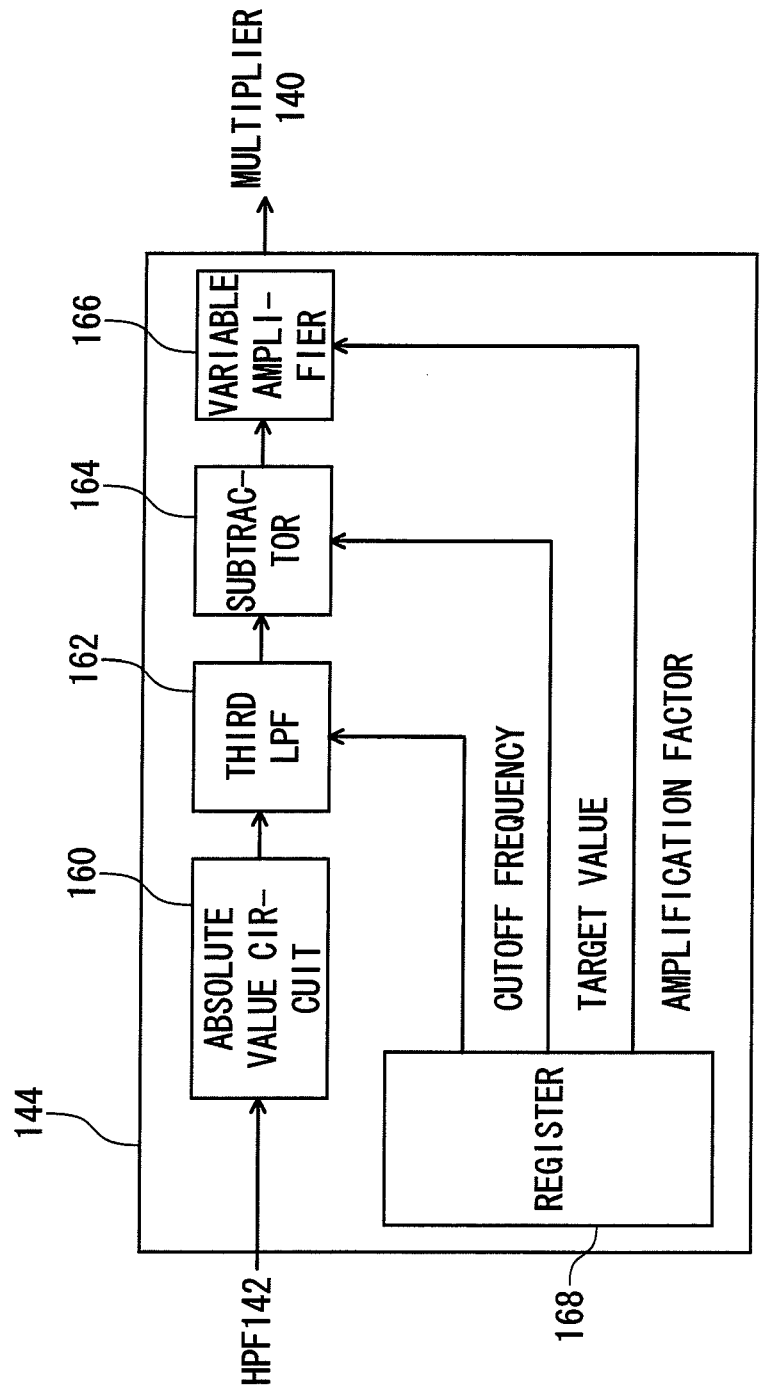
FIG. 2 is an exemplary view showing a configuration of an amplification factor controller.

FIG. 2 shows the configuration of the amplification factor controller 144. In the amplification factor controller 144, an absolute value of the multi-bit signal that is output from the HPF 142 is taken by an absolute value circuit 160 which is an example of a rectification circuit. It suffices that the rectification circuit be capable of AC-to-DC conversion, and the rectification circuit may be a squaring circuit rather than the absolute value circuit 160. High-frequency components of a resulting absolute-value multi-bit signal are cut by a third LPF 162 (smoothing). A difference value between a resulting smoothed multi-bit signal and a target value is obtained by a subtractor 164. The difference value is amplified by a variable amplifier 166, and a resulting value is employed as an amplification factor of the multiplier 140. The target value is a value that determines an amplitude of excitation of the measurement tube, In the above configuration, if the current value of the multi-bit signal is smaller than the target value, the output of the amplification factor controller 144 is large (and hence the gain of the resonance circuit 132 is large). As the value of the multi-bit signal approaches the target value, the output of the amplification factor controller 144 comes closer to zero (and hence the gain of the resonance circuit 132 becomes lower). In this manner, the amplification factor controller 144 can control the amplification factor so that the vibration amplitude of the measurement tube is kept constant.

Sets of a cutoff frequency to be used in the third LPF 162, a target value to be used in the subtractor 164, and an amplification factor to be used in the variable amplifier 166 are stored in a register 168 so as to be correlated with respective diameters of measurement tubes.

As for the cutoff frequency of the third LPF 162, the speed of a response of the resonance circuit 132 that is caused when a fluid condition is changed is increased by increasing the cutoff frequency. On the other hand, since the third LPF 162 is a circuit for obtaining a DC signal by smoothing a multi-bit signal, if the cutoff frequency is set too high ripples remain to render the control of the resonance circuit 132 unstable. The response speed is increased and a stable control is enabled by setting the cutoff frequency of the third LPF 162 according to the resonance frequency of a measurement tube (the resonance frequency varies depending on the diameter).

Figure 3A:
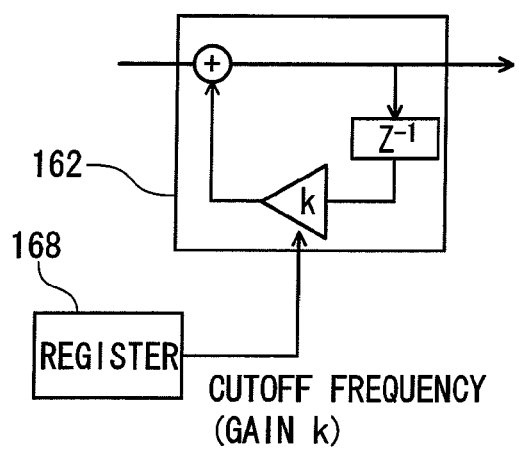
FIGS. 3A and 3B are exemplary views showing a configuration of a third LPF and how its cutoff frequency is set.
Figure 3B:
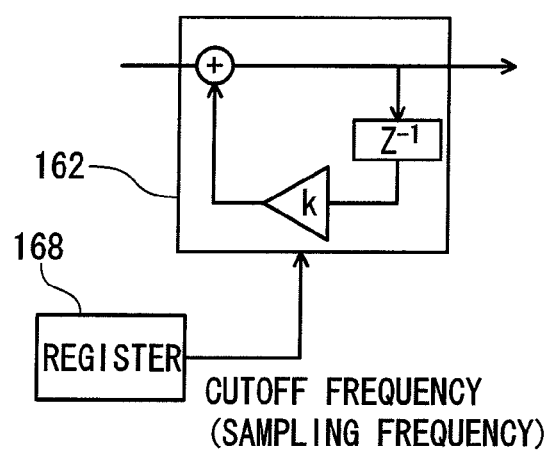

FIGS. 3A and 3B show the configuration of the third LPF 162 and how its cutoff frequency is set. In the examples of FIGS. 3A and 3B, the third LPF 162 is a first-order IIR (infinite impulse response) filter. In the example of FIG. 3A, transfer functions (gains k) of the IIR filter are stored in the register 168 so as to be correlated with respective diameters and the cutoff frequency is varied by changing the transfer function. In the example of FIG. 3B, the transfer function of the IIR filter is fixed and the cutoff frequency is varied by changing the LPF sampling frequency according to the diameter.

The third LPF 162 is not limited to the first-order IIR filter shown in FIGS. 3A and 3B and may be a higher-order IIR filter, an FIR (finite impulse filter), or the like.

Since the amplitude of stable vibration of a measurement tube depends on the diameter, target values to be used in the subtractor 164 are also stored in the register 168 so as to be correlated with respective diameters. A stable control is enabled by setting a target value according to the diameter of an attached measurement tube. When air bubbles are mixed into a fluid, saturation of excitation power can be avoided by setting the target value small. High stability of a mass flow rate output can thus be secured.

The variable amplifier 166 can be implemented as a multiplier or a shift operation module. The reason why the amplifier 166 should be a variable one is that the loop gain depends on a voltage characteristic of the path from the exciter 116 to the first sensor 112 via the measurement tube. Since the voltage characteristic depends on the diameter of a measurement tube, a stable control is enabled by setting the amplification factor of the variable amplifier 166 to a value that is suitable for a diameter.

As described above, the single excitation circuit 130 can excite measurement tubes having different diameters stably because the amplification factor controller 144 sets a cutoff frequency to be used in the third LPF 162, a target value to be used in the subtractor 164, and an amplification factor to be used in the variable amplifier 166 that are suitable for the diameter of the measurement tube attached. When the diameter of the measurement tube has been changed, output values to be used of the register 168 can be changed by inputting a new diameter value to the amplification factor controller 144 of the Coriolis mass flowmeter 100 from an input module (not shown).

Embodiment 2

Figure 4:
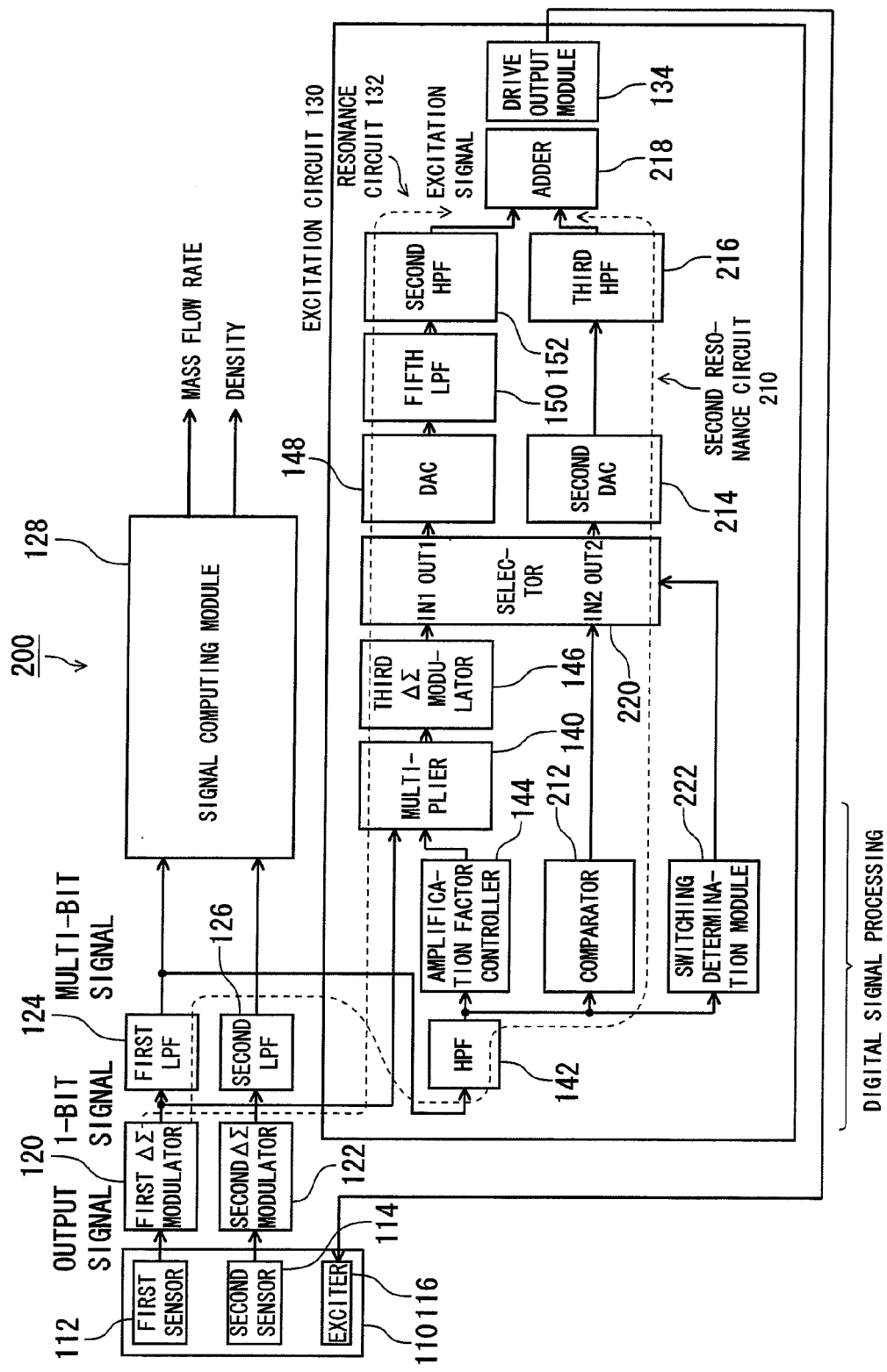
FIG. 4 is an exemplary view showing a Coriolis mass flowmeter according to a second embodiment.

FIG. 4 shows a Coriolis mass flowmeter 200 according to a second embodiment. Components having the same or similar ones in the first embodiment will be given the same reference symbols as the latter and will not be described in detail. In the resonance circuit 132 of the first embodiment, the amplification factor is controlled so that the vibration amplitude becomes constant when the vibration state of the measurement tube approaches a stable state. In the second embodiment, a second resonance circuit 210 having a large amplification factor is provided in addition to the resonance circuit 132 and switching is made between them.

The second resonance circuit 210 includes a comparator 212, a second DAC 214 and a third HPF 216. The comparator 212 binarizes the multi-bit signal that is output from the HPF 142. The comparator 212 compares the multi-bit signal (AC signal) with zero (its center level) and binarizes it into an H value or an L value. That is, whereas the input and the output of the comparator 212 have the same phase, the comparator 212 produces the maximum output value as long as the input is positive even if its absolute value is very small.

The output (binarized signal) of the comparator 212 is converted into an analog signal by the second DAC 214. For example, the digital-to-analog conversion is performed in such a manner that the L level and the H level are converted into 0 V and 2.5 V, respectively. A DC component of a resulting rectangular wave is cut by the third HPF 216.

A selector 220 for switching between the resonance circuit 132 and the second resonance circuit 210 is disposed between the third ΔΣ modulator 146 and the DAC 148 of the resonance circuit 132 and between the comparator 212 and the second DAC 214 of the second resonance circuit 210.

A switching determination module 222 controls the selector 220 in a manner shown in Table 1 so that the selector 220 passes one of the signal of the resonance circuit 132 and the signal of the second resonance circuit 210. In Table 1, symbols IN1 and OUT1 represent the resonance-circuit-132-side input and output and symbols IN2 and OUT2 represent the second-resonance-circuit-210-side input and output (see FIG. 4). If the output is fixed to the H value or the L value, a resulting DC signal does not reach an adder 218 because it is cut by the second HPF 152 or the third HPF 216.

TABLE 1

| | Resonance circuit 132 is effective | second resonance circuit 210 is effective |
|---|---|---|
| OUT1 | IN1 is output | H or L is output fixedly |
| OUT2 | H or L is output fixedly | IN2 is output |

The signals that are output from the resonance circuit 132 and the second resonance circuit 210 are added together by the adder 218 before the drive output module 134. The excitation signal that is output from the adder 218 is amplified by the drive output module 134 in the same manner as in the first embodiment, and the exciter 134 is driven by an amplified excitation signal. Since one of the signal of the resonance circuit 132 and the signal of the second resonance circuit 210 is selected by the selector 220, only one of those signals is supplied to the drive output module 134.

Figure 5:
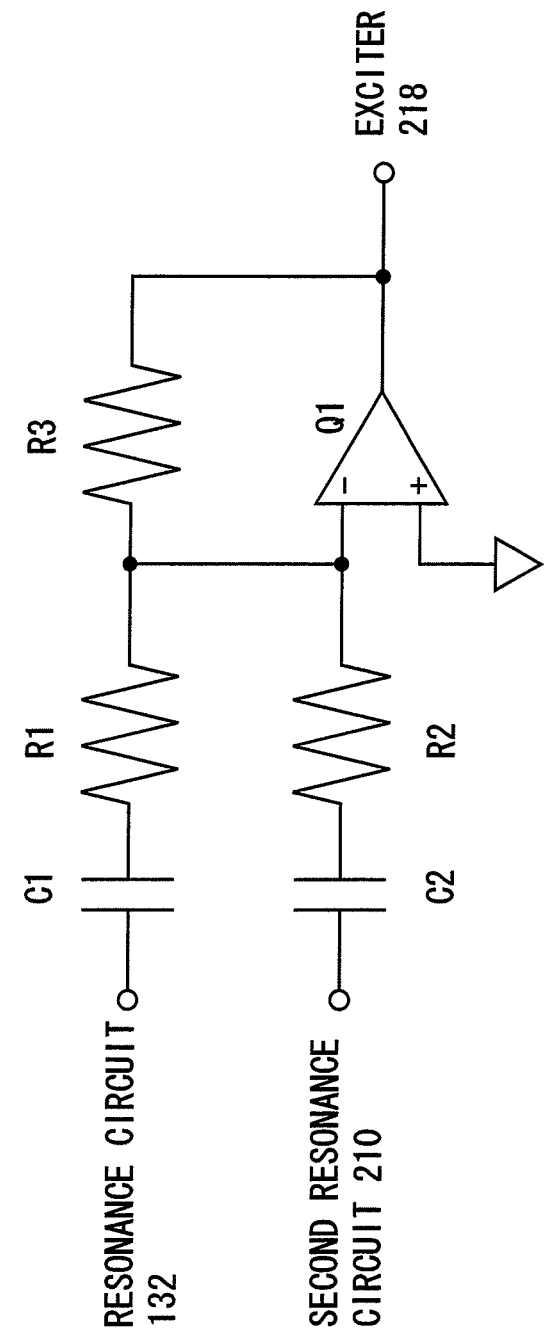
FIG. 5 is an exemplary view showing a configuration including a second HPF, a third HPF, an adder, and a drive output module.

FIG. 5 shows a configuration including the second HPF 152, the third HPF 216, the adder 218, and the drive output module 134. As shown in FIG. 5, these components can be implemented as an integral operation circuit. More specifically, a highpass filter having a gain −R3/R1, which corresponds to the second HPF 152 and the drive output module 134, is formed by a capacitor C1, a resistor R1, an operational amplifier Q1, and a resistor R3. A highpass filter having a gain −R3/R2, which corresponds to the third HPF 216 and the drive output module 134, is formed by a capacitor C2, a resistor R2, the operational amplifier Q1, and the resistor R3. The operational amplifier Q1 and the resistor R3 are shared by connecting both of the resistors R1 and R2 to the inverting input terminal of the operational amplifier Q1.

Figure 6:
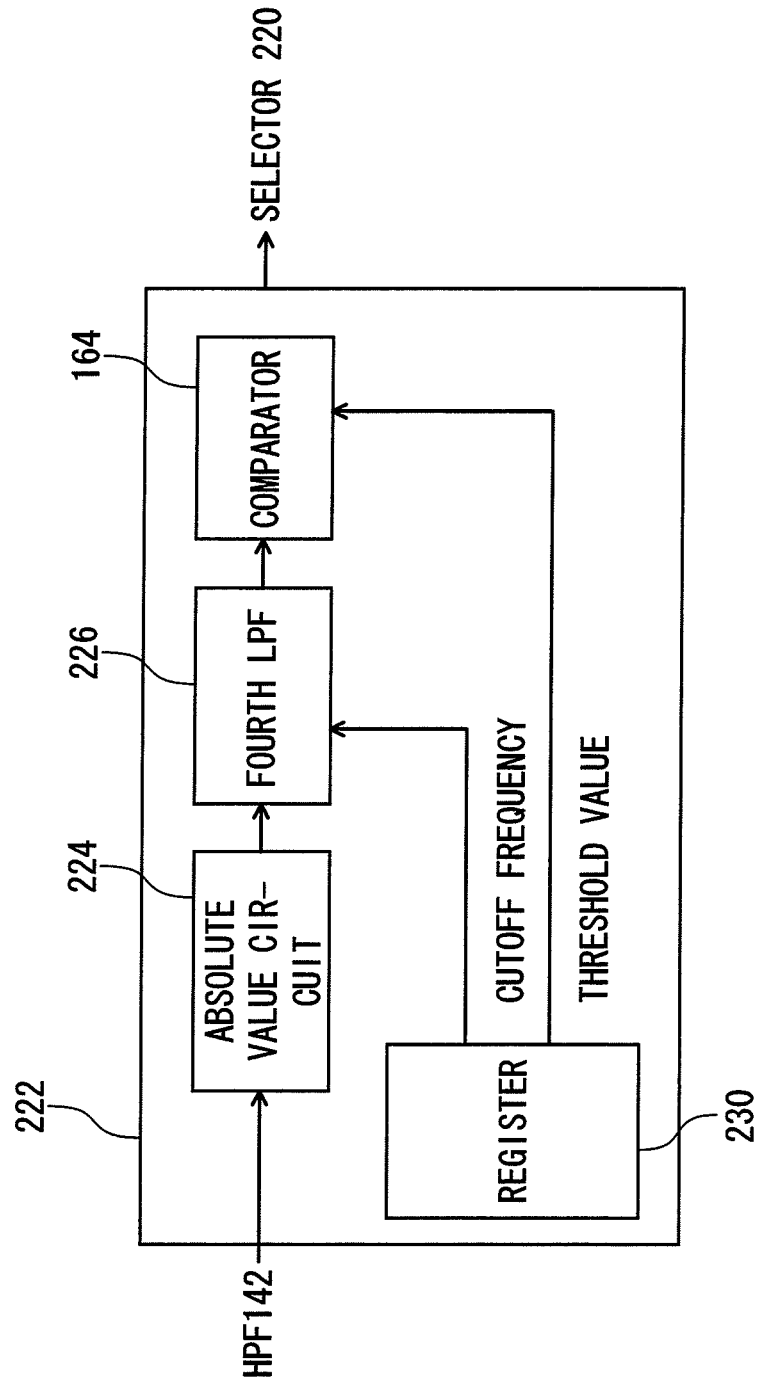
FIG. 6 is an exemplary view showing a configuration of a switching determination module.

FIG. 6 shows the configuration of the switching determination module 222. In the switching determination module 222, first, an absolute value of the multi-bit signal that is output from the HPF 142 is taken by an absolute value circuit 224. As in the case of the amplification factor controller 144, a squaring circuit may be used in place of the absolute value circuit 224. High-frequency components of a resulting absolute-value multi-bit signal are out by a fourth LPF 226 (smoothing). A resulting multi-bit signal is compared with a threshold value by a comparator 228 to determine an operation of the selector 220. More specifically, the resonance circuit 132 is made effective if the multi-bit signal is larger than the threshold value, and the second resonance circuit 210 is made effective if the multi-bit signal is smaller than the threshold value. The comparator 228 may be a hysteresis comparator, in which case a stable operation is realized because switching between the resonance circuit 132 the second resonance circuit 210 is caused frequently when the multi-bit signal has values around the threshold value.

With the above configuration, the measurement tube is excited by the second resonance circuit 210 having a large amplification factor at the time of activation when the vibration amplitude of the measurement tube is small. After the vibration amplitude of the measurement tube has exceeded a certain value, the measurement tube is excited by the resonance circuit 132 which is controlled so that the vibration amplitude is kept constant. A stable state can thus be reached quickly.

Cutoff frequencies to be used in the fourth LPF 226 are stored in a register 230 so as to be correlated with respective diameters of measurement tubes. A cutoff frequency corresponding to the diameter of an attached measurement tube is called and used.

As for the cutoff frequency of the fourth LPF 226 of the switching determination module 222, the speed of switching between the resonance circuit 132 and the second resonance circuit 210 is increased by increasing the cutoff frequency. On the other hand, since the fourth LPF 226 is a circuit for obtaining a DC signal by smoothing a multi-bit signal, if the cutoff frequency is set too high ripples remain to render the control unstable. The response speed is increased and a stable control is enabled by, as mentioned above, setting the cutoff frequency of the fourth LPF 226 according to the resonance frequency of a measurement tube (the resonance frequency varies depending on the diameter).

Like the third LPF 162 of the amplification factor controller 144 shown in FIG. 3, the fourth LPF 226 may be a first-order IIR filter, a higher-order IIR filter, an FIR filter, or the like.

Threshold values to be used in the comparator 228 are stored in the register 230 so as to be correlated with the respective target values to be used in the subtractor 164. More specifically, the threshold value is increased as the target value increases, whereby a stable state can be established early by the second resonance circuit 210 having a large amplification factor. Threshold values are stored in the register 230 so as to be correlated with the respective target values and the threshold value of the comparator 228 is also changed when the target value is changed.

Embodiment 3

Figure 7:
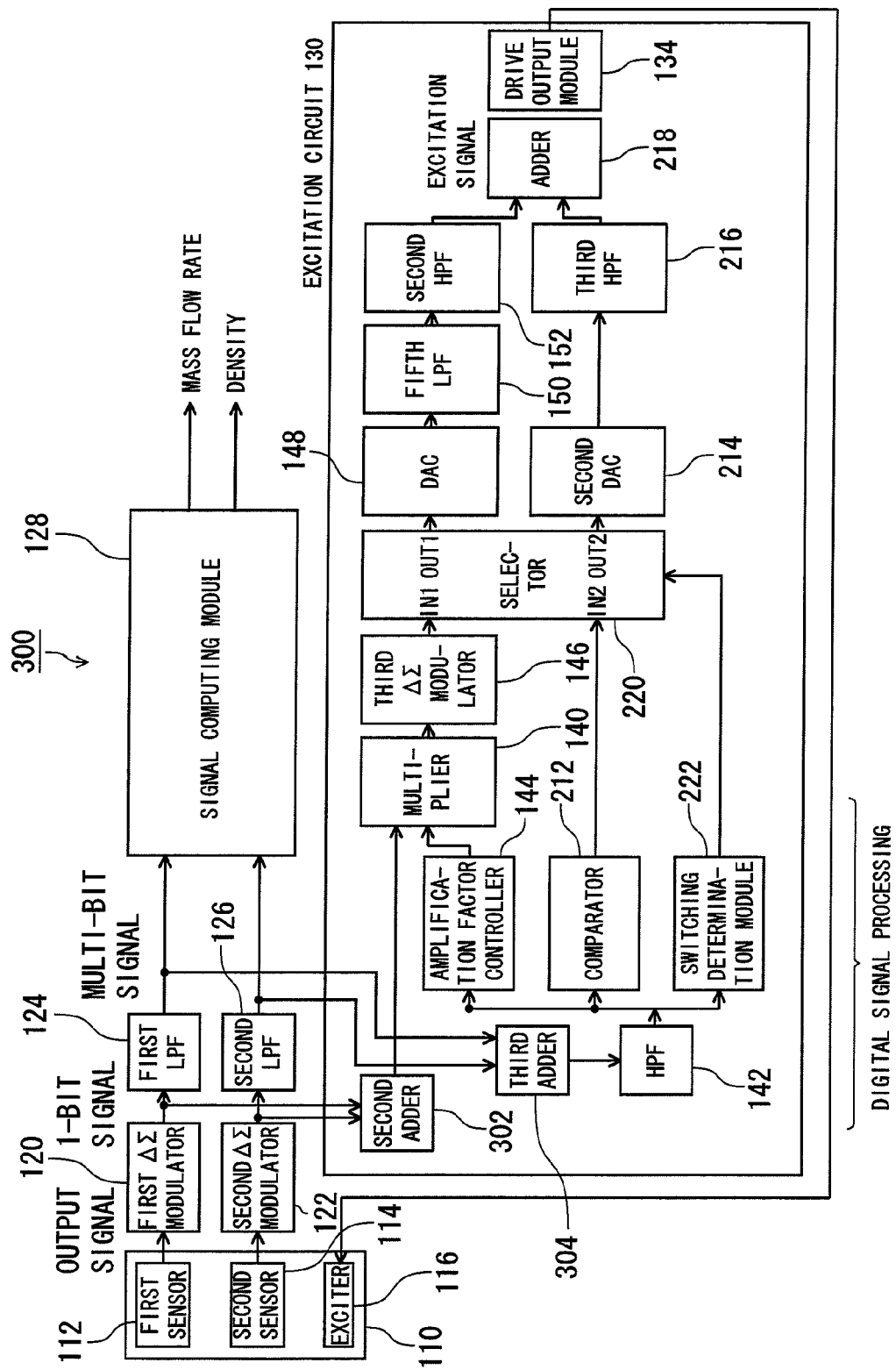
FIG. 7 is an exemplary view showing a Coriolis mass flowmeter according to a third embodiment.

FIG. 7 shows a Coriolis mass flowmeter 300 according to a third embodiment. Components having the same or similar ones in the fast or second embodiment will be given the same reference symbols as the latter and will not be described in detail. In the first and second embodiments, the pulse density signal that is output from the first ΔΣ modulator 120 and the multi-bit signal that is output from the first LPF 124 are used in the excitation circuit 130.

In contrast, in this embodiment, as shown in FIG. 7, a second adder 302 is provided which adds together the pulse density signals that are output from the first ΔΣ modulator 120 and the second ΔΣ modulator 122 and a resulting addition signal that is output from the second adder 302 is supplied to the multiplier 140. Furthermore, a third adder 304 is provided which adds together the multi-bit signals that are output from the first LPF 124 and the second LPF 126 and a resulting addition multi-bit signal that is output from the third adder 304 is supplied to the HPF 142.

Since the addition signal of the two signals (two pulse density signals or two multi-bit signals) are used (their average is taken), even if the output of the first sensor 112 or the second sensor 114 is disordered because of mixing of air bubbles in a fluid, influence of the disorder in the output can be reduced.

Other Embodiments

In each of the above embodiments, the first LPF 124 (and the second LPF 126) is shared by the signal computing module 128 and the excitation circuit 130. However, the invention is not limited to such a configuration; LPFs may be provided independently for the signal computing module 128 and the excitation circuit 130.

Although in the second and third embodiments the absolute value circuit 160 of the amplification factor controller 144 and the absolute value circuit 224 of the switching determination module 222 are separate components, an absolute value circuit may be shared by the amplification factor controller 144 and the switching determination module 222. That is, another embodiment is possible in which a common absolute value circuit is disposed downstream of the HPF 142 and the output of the common absolute value circuit branches off so that an output signal of the common absolute value circuit is supplied to the third LPF 162 and the fourth LPF 226. The same applies to a case that the common absolute value circuit is replaced by a common squaring circuit.

While certain embodiments have been described, these embodiments have been presented by way of example only, and are not intended to limit the scope of the invention. Indeed, the novel apparatus described herein may be embodied in a variety of other forms; furthermore, various omissions, substitutions and changes in the form of the apparatus, described herein may be made without departing from the sprit of the invention. The accompanying claims and their equivalents are intended to cover such forms or modifications as would fall within the scope and sprit of the invention.

The Coriolis mass flowmeter according to the invention can be used as a Coriolis mass flowmeter for measuring a mass flow rate of a fluid that is flowing through a measurement tube.

DRAWINGS

[FIG. 1]
112: FIRST SENSOR
114: SECOND SENSOR
116: EXCITER
120: FIRST ΔΣ MODULATOR
122: SECOND ΔΣ MODULATOR
124: FIRST LPF
126: SECOND LPF
128: SIGNAL COMPUTING MODULE
130: EXCITATION CIRCUIT
132: RESONANCE CIRCUIT
134: DRIVE OUTPUT MODULE
140: MULTIPLIER
144: AMPLIFICATION FACTOR CONTROLLER
146: THIRD ΔΣ MODULATOR
150: FIFTH LPF
152: SECOND HPF
[FIG. 2]
160: ABSOLUTE VALUE CIRCUIT
162: THIRD LPF
164: SUBTRACTOR
166: VARIABLE AMPLIFIER
168: REGISTER
[FIG. 3A]
168: REGISTER
[FIG. 3B]
168: REGISTER
[FIG. 4]
112: FIRST SENSOR
114: SECOND SENSOR
116: EXCITER
120: FIRST ΔΣ MODULATOR
122: SECOND ΔΣ MODULATOR

124: FIRST LPF
126: SECOND LPF
128: SIGNAL COMPUTING MODULE
130: EXCITATION CIRCUIT
132: RESONANCE CIRCUIT
134: DRIVE OUTPUT MODULE
140: MULTIPLIER
144: AMPLIFICATION FACTOR CONTROLLER
146: THIRD ΔΣ MODULATOR
150: FIFTH LPF
152: SECOND HPF
210: SECOND RESONANCE CIRCUIT
212: COMPARATOR
214: SECOND DAC
216: THIRD HPF
218: ADDER
220: SELECTOR
222: SWITCHING DETERMINATION MODULE
[FIG. 6]
224: ABSOLUTE VALUE CIRCUIT
226: FOURTH LPF
228: COMPARATOR
230: REGISTER
[FIG. 7]
112: FIRST SENSOR
114: SECOND SENSOR
116: EXCITER
120: FIRST ΔΣ MODULATOR
122: SECOND ΔΣ MODULATOR
124: FIRST LPF
126: SECOND LPF
128: SIGNAL COMPUTING MODULE
130: EXCITATION CIRCUIT
134: DRIVE OUTPUT MODULE
140: MULTIPLIER
144: AMPLIFICATION FACTOR CONTROLLER
146: THIRD ΔΣ MODULATOR
150: FIFTH LPF
152: SECOND HPF
212: COMPARATOR
214: SECOND DAC
216: THIRD HPF
218: ADDER
220: SELECTOR
222: SWITCHING DETERMINATION MODULE
302: SECOND ADDER
304: THIRD ADDER

What is claimed is:

1. A Coriolis mass flowmeter comprising:
two sensors configured to measure deformation amounts of a measurement tube which generates when the measurement tube which is fixed at both ends is vibrated as a fluid flows through it;
a first ΔΣ modulator and a second ΔΣ modulator configured to convert output signals of the two sensors into pulse density signals, respectively;
a first LPF and a second LPF configured to convert the pulse density signals that are output from the first ΔΣ modulator and the second ΔΣ modulator into multi-bit signals, respectively;
a signal computing module configured to calculate a mass flow rate on the basis of the two multi-bit signals;
a resonance circuit configured to generate an excitation signal on the basis of at least one of the output signals of the two sensors;
a drive output module configured to amplify the excitation signal; and
an exciter configured to excite the measurement tube using an amplified excitation signal,
wherein the resonance circuit comprises:
a multiplier configured to amplify one of the pulse density signals that are output from the first ΔΣ modulator and the second ΔΣ modulator or a signal generated from the pulse density signals that are output from the first ΔΣ modulator and the second ΔΣ modulator to generate a multi-bit signal;
an amplification factor controller configured to control an amplification factor of the multiplier on the basis of at least one of the multi-bit signals that are output from the first LPF and the second LPF so that vibration amplitude of the measurement tube is stabilized;
a third ΔΣ modulator configured to convert an amplified, multi-bit signal into a pulse density signal; and
a DAC configured to generate the excitation signal on the basis of the pulse density signal that is output from the third ΔΣ modulator.

2. The Coriolis mass flowmeter according to claim 1, wherein the amplification factor controller comprises:
a rectification circuit configured to take an absolute value of one of the multi-bit signals that are output from the first LPF and the second LPF or a signal generated from the multi-bit signals that are output from the first LPF and the second LPF;
a third LPF configured to smooth an output signal of the rectification circuit by cutting high-frequency components thereof;
a subtractor configured to obtain a difference value between a smoothed multi-bit signal and a target value;
a variable amplifier configured to amplify the difference value; and
a register configured to store cutoff frequencies to be used in the third LPF, target values to be used in the subtractor, and amplification factors to be used in the variable amplifier in such a manner that they are correlated with respective diameters of measurement tubes.

3. The Coriolis mass flowmeter according to claim 2, further comprising:
a second resonance circuit configured to supply an excitation signal to the drive output module, the second resonance circuit comprising a comparator configured to binarize one of the multi-bit signals that are output from the first LPF and the second LPF or the signal generated from the multi-bit signals that are output from the first LPF and the second LPF and a second DAC configured to convert a binarized signal into an analog signal;
a selector configured to switch between the resonance circuit and the second resonance circuit; and
a switching determination module configured to control the selector;
wherein the switching determination module comprises:
a rectification circuit configured to take an absolute value of one of the multi-bit signals that are output from the first LPF and the second LPF or the signal generated from the multi-bit signals that are output from the first LPF and the second LPF;
a fourth LPF configured to smooth an output signal of the rectification circuit by cutting high-frequency components thereof;
a comparator configured to compare a high-frequency-components-cut multi-bit signal with a threshold value; and
a register configured to store cutoff frequencies to be used in the fourth LPF so as to be correlated with the respective diameters of the measurement tubes and to store threshold values to be used in the comparator so as to be correlated with the respective target values to be used in the subtractor, and wherein the drive output module is configured to amplify the excitation signal which is an output signal of the resonance circuit or the second resonance circuit selected by the selector.

4. The Coriolis mass flowmeter according to claim 1, further comprising:

a second adder configured to add together the pulse density signals that are output from the first ΔΣ modulator and the second ΔΣ modulator; and a third adder configured to add together the multi-bit signals that are output from the first LPF and the second LPF, wherein an addition signal generated by the second adder is supplied to the multiplier; and wherein an addition multi-bit signal generated by the third adder is supplied to the amplification factor controller.

* * * * *